Patented Aug. 26, 1952

2,608,491

UNITED STATES PATENT OFFICE 2,608,491

SETTING AND BINDING MATERIAL FROM RESIDUES OF HYDROFLUORIC ACID MANUFACTURE

Herman Weber, Harriman, Tenn.

No Drawing. Application March 25, 1949, Serial No. 83,518

3 Claims. (Cl. 106—109)

This is a continuation-in-part of my application, Serial No. 792,337, filed December 17, 1947, now Patent No. 2,574,507, November 13, 1951.

This invention relates to a cementitious material made from the residues of the manufacture of fluorides and synthetic cryolite from fluorspar. Materials of this kind contain as a major ingredient anhydrous calcium sulphate (synthetic anhydrate) and other ingredients resulting from said manufacture, for instance small amounts of sulphuric acid and hydrofluoric acid.

The object of my invention is to provide a cementitious composition of matter which utilizes materials of this kind in such a manner that a minimum of treatment and handling of the material is necessary.

It is another object of the invention to provide a cementitious material capable of setting and forming products having compressive strengths equal to or greater than any other cementitious materials based on calcium sulphate.

Other objects and advantages and uses of the process and products according to this invention will become apparent from the following specification thereof.

The cementitious material according to this invention is prepared by adding an accelerator to the starting material.

It has been found that plasters of the accelerated anhydrite type can be prepared by using cement, preferably Portland cement, as an accelerator.

No other treatment of this starting material is necessary to produce products which set perfectly after the addition of water thereto, nor will it be necessary to add other accelerators to the raw material.

It has been found that fresh residue resulting from the fluoride and the cryolite process, as well as the material from the waste pile can be used as the starting material, according to my invention.

In carrying out my invention, the residue calcium sulfate ($CaSO_4$) containing varying small amounts of sulfuric acid ($H_2SO_4$) and hydrofluoric acid (HF) is neutralized with limestone dust ($CaCO_3$), ground to pass an 80 mesh sieve, and mixed with 3–5% Portland cement, which serves as an accelerator, to make the cementitious material.

If the residue has been neutralized by weathering on exposed dumps, no treatment with limestone dust is necessary. Products prepared from these cementitious materials have desirable properties equal to or better than similar products prepared from plaster of Paris, manufactured by calcining gypsum.

The compressive strength of the product will be after 28 days 3500+ p. inch² if fresh starting material is used, and 2500+ p. inch² after 28 days if old material from the dumps is used. The cementitious compositions of the invention may be used for the same purposes as previously known plasters. They can be used as cementitious binders for moulding set masses, as, plaster floors (Estrick), wall plasters, decorative plasters, and so forth.

To confer special properties, modifying agents may be added to the compositions, e. g., pigments, inert materials, as light ashes, sand, sawdust, paper or textile fibers, and so forth. The organic materials are preferably mineralized, e. g., with diluted water glass.

Sand can be added up to 1 to 3.

Articles, for instance stones, manufactured according to the new process are much more water resistant than gypsum stones. As to the freezing resistance, experiments have been made by alternately freezing and thawing the finished products 25 times without injury to the same.

The following formulas are given as examples for different kinds of use of the composition of matter according to this invention:

*Formula 1.*—As a neat mixture usable for inside work only as solid partition blocks, bricks, plates, and floors, and as finish coat plaster, etc.:

By weight:
  100 parts cementitious material
  18–28 parts water

|  | Pounds per Square Inch After | |
|---|---|---|
|  | 7 days | 28 days |
| Compression Resistance | 2,500+ | 3,500+ |
| Tensile Strength | 185 | 300+ |

Hardness = 3.

*Formula 2.*—For use as first coat plaster or mortar (1:1):

By weight:
  100 parts cementitious material
  100 parts fine sand
  40 parts water

|  | Pounds per Square Inch After | |
|---|---|---|
|  | 7 days | 28 days |
| Compression Resistance | 1,800+ | 2,500+ |
| Tensile Strength | 150+ | 250+ |

*Formula 3.*—For use as second coat plaster or mortar (1:2):

By weight:
  100 parts cementitious material
  200 parts fine sand
  45 parts water

|  | Pounds per Square Inch After | |
|---|---|---|
|  | 7 days | 28 days |
| Compression Resistance | 1,000+ | 1,200+ |
| Tensile Strength | 110+ | 130+ |

*Formula 4.*—For use as base coat plaster or mortar (1:3):

By weight:
  100 parts cementitious material
  300 parts fine sand
  50 parts water

|  | Pounds per Square Inch After | |
|---|---|---|
|  | 7 days | 28 days |
| Compression Resistance | 250+ | 400+ |
| Tensile Strength | 30+ | 50+ |

Any inorganic material such as rockwool, glass fiber, cinders, etc., can be added for special purposes; also organic materials after mineralizing such with sodium silicate.

I claim:

1. A new anhydrous quick-setting material consisting of finely ground neutralized artificial anhydrite resulting from the process of producing fluorine by the decomposition of fluorspar with concentrated sulfuric acid, and 3-5% of hydraulic cement.

2. The process of manufacturing an anhydrous setting and binding material consisting in adding an amount of 3-5% by weight of an hydraulic cement to neutral or neutralized residues resulting from the process of producing fluorine by the decomposition of fluorspar with concentrated sulfuric acid, ground to pass an 80 mesh sieve, said residues containing as principal ingredients calcium sulfate, sulfuric acid, hydrofluoric acid and minor amounts of other impurities as silica, aluminum and iron oxide and fluorspar.

3. The process set forth in claim 2 wherein an hydraulic binder is mixed with the artificial anhydrite resulting from the decomposition of fluorspar with concentrated sulfuric acid, said hydraulic binder consisting of Portland cement.

HERMAN WEBER.

REFERENCES CITED

The following references are of record in the file of this patent:

UNITED STATES PATENTS

| Number | Name | Date |
|---|---|---|
| 1,951,691 | Coxon | Mar. 20, 1934 |
| 1,972,527 | Lefebure | Sept. 4, 1934 |

FOREIGN PATENTS

| Number | Country | Date |
|---|---|---|
| 524,147 | France | 1921 |
| 401,190 | Germany | 1924 |
| 706,007 | Germany | 1941 |